(12) United States Patent
Marchant et al.

(10) Patent No.: US 10,150,054 B1
(45) Date of Patent: Dec. 11, 2018

(54) MULTI DIRECTIONAL DEVICE FOR VAPOR-SOLID MIXING

(71) Applicant: Technip Process Technology, Inc., Houston, TX (US)

(72) Inventors: Paul Marchant, Houston, TX (US); Raj Kanwar Singh, Houston, TX (US)

(73) Assignee: Technip Process Technology, Inc., Houston, TX (US)

( * ) Notice: Subject to any disclaimer, the term of this patent is extended or adjusted under 35 U.S.C. 154(b) by 0 days.

(21) Appl. No.: 15/827,410

(22) Filed: Nov. 30, 2017

(51) Int. Cl.

| | | |
|---|---|---|
| B01J 8/00 | (2006.01) | |
| B01J 8/08 | (2006.01) | |
| B01J 8/18 | (2006.01) | |
| B01J 8/24 | (2006.01) | |
| B01J 8/34 | (2006.01) | |
| B01J 8/38 | (2006.01) | |
| B01J 19/32 | (2006.01) | |
| B01D 15/18 | (2006.01) | |
| B01D 53/12 | (2006.01) | |

(52) U.S. Cl.
CPC .......... *B01D 15/1807* (2013.01); *B01J 8/082* (2013.01); *B01J 8/34* (2013.01); *B01J 8/382* (2013.01); *B01D 53/12* (2013.01); *B01J 2219/32466* (2013.01)

(58) Field of Classification Search
CPC ........ B01D 15/00; B01D 15/08; B01D 15/10; B01D 15/18; B01D 15/1807; B01D 53/00; B01D 53/02; B01D 53/06; B01D 53/10; B01D 53/12; B01J 8/00; B01J 8/08; B01J 8/082; B01J 8/18; B01J 8/24; B01J 8/34; B01J 8/38; B01J 8/382; B01J 19/00; B01J 19/32; B01J 2219/32–2219/32206; B01J 2219/32279; B01J 2219/32286; B01J 2219/324; B01J 2219/32466

See application file for complete search history.

(56) References Cited

U.S. PATENT DOCUMENTS

| | | |
|---|---|---|
| 5,407,607 A | 4/1995 | Mix |
| 5,463,113 A | 10/1995 | Yamamoto et al. |
| 5,470,542 A | 11/1995 | Stringaro |

(Continued)

OTHER PUBLICATIONS

U.S. Appl. No. 15/649,729, filed Jul. 14, 2017, Maller et al.
International Search Report and Written Opinion dated Aug. 24, 2018 issued in PCT/US2018/41906.

*Primary Examiner* — Natasha E Young
(74) *Attorney, Agent, or Firm* — Locke Lord LLP; Alan B. Clement; Peter J. Fallon

(57) ABSTRACT

A packing system is disclosed that has a series of flat blades arranged to promote mixing in a fluidized bed such as one in a FCC stripper, with an upward flowing gas stream and a downward flowing solid particle stream. The blade arrangement provides for different gas solids flow directions within a single layer of packing system to enhance cross mixing of gas and catalyst in all directions and reduces the potential for gas and catalyst bypassing. The blade arrangement has splits which minimizes the tendency for phase separation around the blade. The arrangement and sizing of the blades is intended to promote intimate contact between the two phases to ensure efficient mass transfer of material trapped inside the particles to the gas phase. The arrangement of the blades prevents excessive bubble growth and channeling, both of which reduce surface area for mass transfer.

25 Claims, 6 Drawing Sheets

(56) References Cited

U.S. PATENT DOCUMENTS

| | | | |
|---|---|---|---|
| 5,716,585 | A | 2/1998 | Senegas et al. |
| 6,096,407 | A | 8/2000 | Vodicka et al. |
| 6,224,833 | B1 | 5/2001 | Rall |
| 6,251,499 | B1 | 6/2001 | Lehman et al. |
| 6,267,359 | B1 | 7/2001 | Stippick |
| 6,511,635 | B2 | 1/2003 | Mauleon et al. |
| 7,179,427 | B2 | 2/2007 | Marchant et al. |
| 7,297,249 | B2 | 11/2007 | Kaibel et al. |
| 7,332,132 | B2 * | 2/2008 | Hedrick ................ C10G 11/18 422/144 |
| 8,646,758 | B2 | 2/2014 | Raynal et al. |
| 8,936,757 | B2 | 1/2015 | Gamas-Castellanos et al. |
| 9,174,153 | B2 | 11/2015 | Llamas et al. |
| 9,238,210 | B2 | 1/2016 | Marchant et al. |

\* cited by examiner

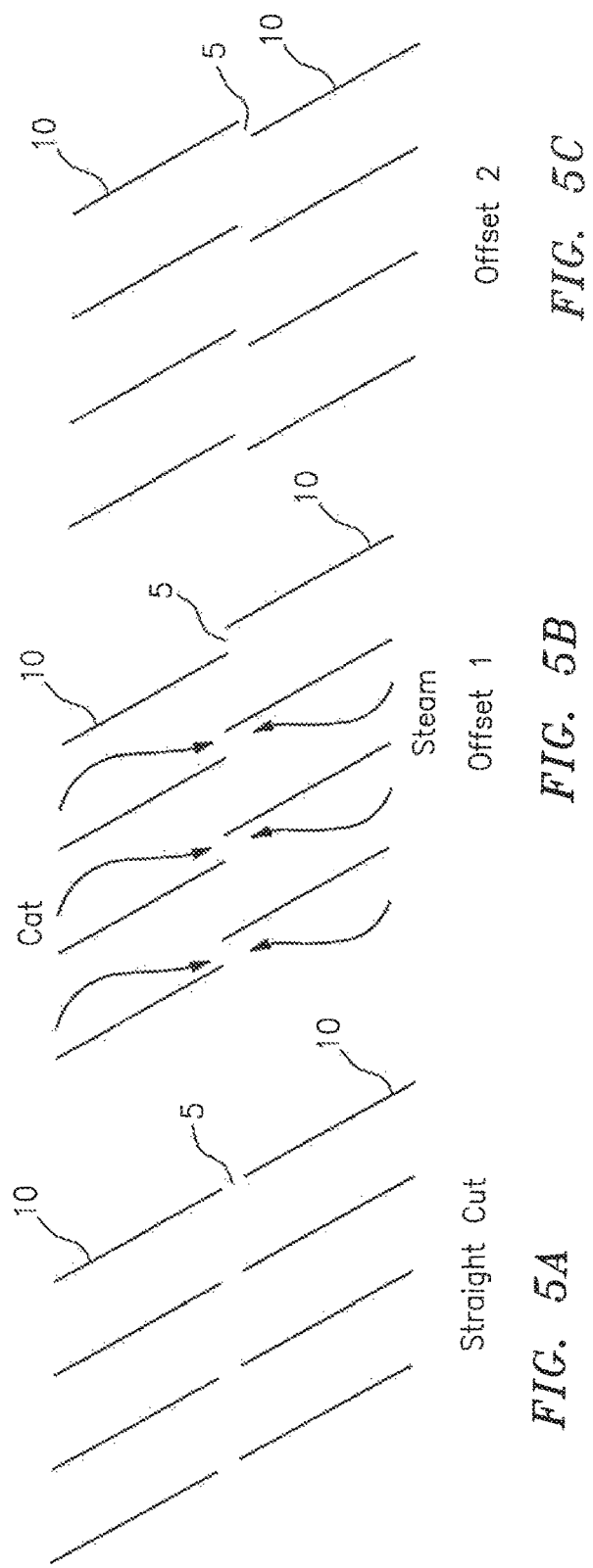

MULTI DIRECTIONAL DEVICE FOR VAPOR-SOLID MIXING

FIELD OF THE INVENTION

The present disclosure relates to internals utilized in fluidized beds in which solid particulates and fluids flow in a countercurrent relationship. More particularly, the embodiments disclosed herein are directed to packing elements comprising of multiple baffles, utilized to facilitate contact between the solid particulates and fluids in the fluidized bed.

DESCRIPTION OF THE RELATED ART

The Fluidized Catalytic Cracking (FCC) process is a chemical process commonly used in oil refineries, the purpose of which is to convert heavy, high molecular weight hydrocarbon materials into lighter lower molecular weight hydrocarbon fractions. In this type of process a hydrocarbon feedstock is vaporized at high temperatures and at the same time placed in contact with the particles of the cracking catalyst maintained in suspension in the feedstock vapor and entrained thereby. After the cracking reactions have produced the desired molecular weight range with a corresponding drop in boiling points, the product vapor obtained is separated from the catalyst particles. The particles are subsequently stripped to recover the entrained hydrocarbons, regenerated by burning the coke formed thereon and recycled by once again being placed in contact with the feedstock to be cracked.

In this process, the desired decrease in boiling point of the hydrocarbons is brought about by controlled catalytic and thermal reactions. These reactions take place almost instantaneously when the finely atomized feedstock is brought in contact with the catalyst particles. In the short time during which the catalyst particles are in contact with the feedstock, the particles deactivate essentially because of hydrocarbon adsorption and deposition of coke and other contaminants onto the active sites of the catalyst. It is necessary to strip the deactivated catalyst continuously, for example with steam, to recover volatile hydrocarbons adsorbed and entrained in the voids prior to regeneration of the catalyst, continuously and without altering its properties, by controlled combustion of the coke in a single-stage or multistage regeneration section before recycling the catalyst particles to the reaction zone.

Stripping is one of the determining steps in the fluid catalytic cracking process. In fact, insufficient stripping results in the reactor effluent remaining on and in between the catalyst particles so that during the regeneration step an additional combustion load is imposed upon the regenerator with excessive heat production beyond the heat needed to drive the catalytic reaction. As a result, the combustion of entrained hydrocarbon vapors into the regenerator represents a loss in final yield of converted product.

In an FCC process the stripping of the catalyst particles typically takes place in a deep fluidized bed to promote vigorous mixing, intimate contact of fluid streams and catalyst particles within a vessel and to provide sufficient residence time for stripping. Fluidized beds are usually generated by passing a fluid stream, typically a vapor stream, upwardly through a bed of solid particles at a flow rate sufficient to suspend the particles and cause a gas solid mixing within the bed.

Generally, after reactor effluents are separated from the catalyst particles, the particles are directed to a stripping chamber where stripping takes place in a descending dense fluidized phase. A gaseous fluid injected at the bottom of the chamber is used to fluidize the coked catalyst particles and displace the entrained hydrocarbons located in the interstitial spaces between the particles. It is preferential to use a polar material, such as steam, for this gaseous fluid, as it is more strongly adsorbed by the catalyst particles and thus the hydrocarbons are more readily displaced. Finally, the stripped catalyst particles are transferred to the regeneration zone.

Moreover, the stripping operation is challenging. In particular, it is difficult to control the travel of the catalyst particles and to avoid partial de-fluidization linked with channeling (direct passage of large bubbles through the fluidized bed) and with back-mixing (downflow of poorly fluidized particles or even recirculation of such particles, especially in the region of the stripping chamber wall). Thus, the range of and average stripping time of deactivated catalyst particles and the quality of contact between grains and gaseous fluid are difficult to control particularly in fluidized beds of large volume. The excess steam increases the gas and liquid load on equipment connected to the stripper. For example, the excess steam can increase the quantity of sour water produced per pound of hydrocarbon processed, as well as increase the operating costs for producing and processing the excess steam.

In order to overcome these problems it is necessary to utilize devices internal to the stripper chamber to facilitate effective mixing and improve the dispersion and the homogenization of the particles by the stripping fluid. In particular, while passing through the stripping device, the particles are redistributed in space which ensures a state of organized agitation with the fluid and promotes uniform contact between the fluid and particle phases. The fluid and the particles are directed in a plurality of directions from a single flow. Moreover, the device prevents the back-mixing and channeling of the particles and the formation of solid or gaseous pockets within the stripping chamber.

The use of structured packing elements as the internal stripping device makes it possible to reduce the dimensions of the zone of contact between the solid particles and the fluid. In fact, because this contact is clearly improved, it is possible to use smaller stripping chambers compared to those of the prior art, without a loss in stripping performance even at very high catalyst fluxes through the stripping chamber. Thus, the primary purpose of the packing element is to provide uniform counter current contact of catalyst particles and steam (or other gas media); avoid gas bypassing or channeling through the catalyst bed; and reduction of gas bubble size formed in the fluidized beds.

Different structured packing elements have been proposed to improve stripping. For example, U.S. Pat. No. 6,224,833 to Rall et al., discloses a gas-solid fluidized bed formed within a contacting element having pairs of planar portions or blades arranged in intersecting planes.

Current structured packing elements have various limitations, for example, reduced mixing of the stripping gas and catalyst because a portion of gas stream tends to flow up along the underside of planar portions or blades and a portion of catalyst stream tends to flow down the top side of the blade with little or no interaction between the gas and catalyst. This limits gas catalyst mixing within an element. Also the blade configuration of the current packing elements allow only two directional flow of the phases within the element, which limits the radial mixing within a packing element. Despite the flow direction of each element or layer of elements being 90° oriented to each other the continuous blade surfaces do not provide good redistribution of catalyst and gas throughout the depth of the fluidized bed.

BRIEF SUMMARY OF THE INVENTION

According to an embodiment a packing system is disclosed comprising at least one element structure and the element structure comprises a plurality of planar blades. Each blade has a plane that provides for a gas solids flow direction along the plane. The blades are arranged in alternating intersecting planes to provide a plurality of open spaces between or adjacent the alternating intersecting blades. The planes of the alternating intersecting blades provide at least two different gas solids flow directions for each element structure. At least one blade comprises at least one split that separates the blade into a first split blade section and second split blade section. Each split blade section has a plane and the split between the first blade section and second blade section provides an area for passage to the open spaces.

According to an embodiment the packing system comprises at least four element structures wherein each adjacent element structure is positioned so that the gas solids flow directions of each adjacent element structure is different. The gas solids flow directions of each adjacent element structure can be positioned at a 90 degree angle from each adjacent element structure to provide multiple gas solids flow directions within each element structure.

According to an embodiment the packing system can have a plurality of element structures that are positioned so that the gas solids flow directions of each element structure is different from each successive adjacent element structure. According to a further embodiment the plane of the first blade section is coplanar with the plane second blade section and according to another embodiment the plane of the second blade section can be offset to a plane that is parallel to the plane of the first blade section above or below the first blade section.

According to an embodiment the blade has at least two splits and a third split blade section that has a plane and the plane of the third blade section can be coplanar with the plane of the first and/or second split blade section, or the plane of the third split blade section can be offset to a plane that is parallel to the plane of the first and/or second blade section above or below the first and/or second blade section. The split provides an edge to the first split blade section and the second split blade section and the edge can be square or angled to the plane of the blade. The split can have a shape that is straight, curved, angled, or v-shaped.

In another embodiment the blade and/or the blade section of the packing system comprise slits, holes and/or notch. According to a further embodiment the alternating and intersecting blade and/or blade sections are angled at 90 degrees or less from the fall-line of the blade and/or blade sections when assembled into the element structure.

According to an embodiment a plurality of element structures comprise the packing system to provide a first level of the packing system. Additionally, the packing system at least a second level that is positioned above the first level and each element structure of the second level is positioned with respect to each element structure immediately below in the first level so that the gas solids flow directions of each element structure of the second level is different from the gas solids flow directions of each element structure immediately below in the first level.

According to another embodiment the shape of the element structure of the packing system can be round, oval, rectangular, and hexagonal.

According to yet another embodiment a gas-solid fluidized bed is disclosed, which comprises a vessel having a shell and an internal region within the shell containing a packing system comprising at least one element structure. The element structure comprises a plurality of planar blades, each blade having a plane to provide a gas solids flow direction along the plane The blades are arranged in alternating intersecting planes to provide a plurality of open spaces between or adjacent the alternating intersecting blades. Further, the planes of the alternating intersecting blades provide at least two different gas solids flow directions for the element structure. Furthermore, at least one blade comprises at least one split that separates the blade into at least a first split blade section and at least a second split blade section, each split blade section has a plane, and the split provides an area for passage to the open spaces. According to yet another embodiment the gas-solid fluidized bed has at least one gas stream flowing counter-currently to solid particles through the structured packing system and causing fluidization of the solid particles within the structured packing system to form the gas-solid fluidized bed.

According to an embodiment a method for increasing mass transfer between a gas and a solid particle is disclosed herein. The method comprises the step of passing a gas stream and solid particles in a counter-current manner through a packing system comprising at least one element structure, the element structure comprises a plurality of planar blades, each blade having a plane to provide a gas solids flow direction along the plane and the blades being arranged in alternating intersecting planes to provide a plurality of open spaces between or adjacent the alternating intersecting blades, the planes of the alternating intersecting blades provide at least two different gas solids flow directions for the element structure, and at least one blade comprises at least one split that separates the blade into at least a first split blade section and at least a second split blade section, wherein each split blade section has a plane and the split provides an area for passage to the open spaces. Additionally the method comprises the step of causing fluidization of the solid particles within the packing system to provide a mass transfer between a gas and a solid particle.

As disclosed further herein below, by splitting the blades and varying their orientation within the packing system improved mass transfer is accomplished through increased surface area, intensity of mixing, as well as increased area of flow for the gas and solid phases within the packing system. The claimed packing system is advantageous for reducing channeling and phase separation around the blades, allows portion of catalyst to shower down through the gas flowing up from underneath the lower portion of the blade, thus increasing stripping gas utilization as well as capacity.

The claimed structured packing system provides more open space within the stripping vessel and has less tendency for back-mixing and channeling. Further, the claimed structured packing system is lighter than prior art packing structures due to the splits in the blades, thus making its support easier and less costly.

The embodiments disclosed herein, individually or combined provide improved mass transfer and/or catalyst stripping. The claimed packing system is applicable to any gas solids stripping or reaction process, for example, when utilized with FCC technology the system provides: improved product retention/recovery; reduced "fuel" to regenerator through reduced regenerator temperature and increased catalyst circulation; reduced steam consumption; improved heat buildup; increased catalyst circulation capacity; reduced steam consumption; reduced costs; improved stripper pressure build up; improved hydraulics via better fluidization; improved flexibility; and overall weight reduction.

BRIEF DESCRIPTION OF THE DRAWINGS

FIG. 5 A is a side perspective view of a two split blade sections, wherein the split blade sections are coplanar; FIG. 5 B and FIG. 5C are side perspective views of two second split blade sections, wherein the planes of the split blade sections are offset with respect to one another.

DETAILED DESCRIPTION OF THE INVENTION

Embodiments of the disclosure are described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will be thorough and complete, and will fully convey the scope of the embodiments to those skilled in the art. Like numbers refer to like, but not necessarily the same or identical, elements throughout.

Figure 1:
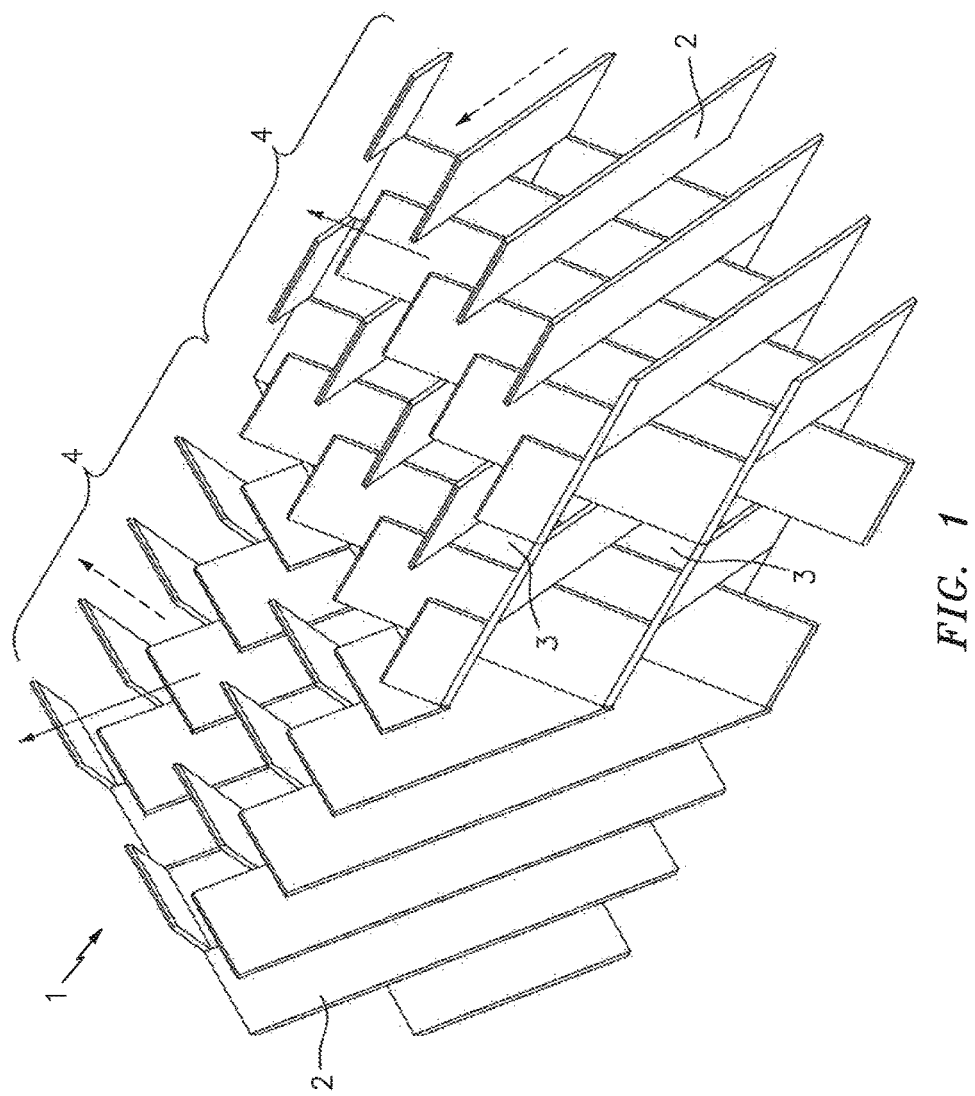
FIG. 1 is a schematic view of the structured packing system containing two element structures. The two element structures are positioned so that each of their gas solids flow directions are at a 90° angle with respect to each other.

FIG. 1 presents two element structures (4) of the claimed packing system (1). Each element structure (4) contains a plurality of substantially flat planar baffles or blade structures, i.e., blades (2). Each blade (2) has a plane that provides a direction for the gas and solids to flow along. The plurality of planar blades (2) are arranged in alternating intersecting planes and provide a plurality of open spaces (3) between or adjacent the alternating intersecting blades (2). Further, the planes of the alternating intersecting blades (2) provide at least two different gas solids flow directions each of the element structure (4). The blade arrangement promotes gas and solids mixing in, for example, a fluidized bed such as FCC stripper (not shown). Furthermore, each element structure (4) can be oriented so that the gas solids flow directions of each adjacent element structure (4) can be different. For example, in FIG. 1 one of the element structures (4) is rotated on its z axis, so that its gas solids flow directions are at a 90° angle with respect to the gas solids flow directions of the adjacent element structure.

The packing system (1) and its components can be fabricated utilizing materials and technology already well established.

As can be seen in FIG. 1 the blades (2) of the element structures (4), which make up the packing element (1), are planar and extend in alternating intersecting planes next to each other and form the three dimensional lattice arrangement of the element structure (4). Where the blades (2) intersect they form acute angle of about 90° degrees or less. The blades (2) are joined together by conventional means either at one end or at an intermediate portion along the length of the blades, for example, where the blades (2) intersect. The width, thickness, and length of the blades (2) are not limited and are determined from mechanical, operational, and processing considerations. The size of the spaces (3), i.e., open spaces or areas that are formed between and framed by the blades (2), depends on the height of the packing system (1). The open spaces (3) of the element structure (4) allow the throughflow of gas and solids.

As noted in FIG. 1, the arrangement of the blades (2) in alternating intersecting planes provide a configuration having substantially square or diamond-shaped open areas or open spaces (3) in-between and adjacent to each of the blades (2). Although the angle is about 900 degrees or less, typically, the angle formed by the alternating intersecting blades (2) is between 60 and 90 degrees, but can be other angles if desired. The alternating intersecting planes of the blades (2) direct a generally upward flowing gas stream and a substantially opposite downward flowing solid particle stream in at least two different gas solids flow directions along both sides of the blades (2). The solid and broken arrows in FIG. 1 represent the upward flowing gas stream on both sides of the blades (2) in different gas solids flow directions and it should be noted that the solid particle stream flows in an opposite direction (not shown in FIG. 1) on both sides of the blades (2). The upward flowing gas stream and opposite downward flowing solid particle stream along both sides of the blades (2) provide the gas solids flow direction, which is directed in different directions due to the alternating planes of the blades (2) within the element structure (4), as presented in FIG. 1. Thus, one element structure (4) provides at least two different gas solids flow directions along the plane of the blades (2). For example, both sides of a first blade (2) slanted vertically from right to left provide a gas solids flow direction up from right to left and down from left to right and the next adjacent alternating intersecting blade (2) (slanted vertically from left to right) provides a gas solids flow direction up from left to right and down from right to left, such that the upward flowing gas streams, as well as the downward solid particle flow, along each blade (2) are moving in different directions within the element structure (4). Two adjacent element structures (4), as presented in FIG. 1, provide a four directional configuration of gas solids flow directions. The arrangement and sizing of the blades (2) are intended to promote intimate contact between the two phases to ensure efficient mass transfer of material trapped inside the catalyst particles to the gas phase.

The packing system (1) may be used in various types of fluidized bed processing of gases and solids, such as processes involving heat exchange, mass transfer, and/or chemical reaction. For example, the structured packing system (1) can be used in the stripper to strip hydrocarbons from spent catalyst or in the regenerator to promote mixing of combustion air with spent catalyst resulting in efficient burning of coke from the spent catalyst in FCC processes. Additionally, the structured packing system (1) can be used in apparatus that effect heat exchange between gases and hot catalyst in FCC, or as flow straightener for catalyst flow or catalyst homogenization device in the FCC withdrawal well to condition catalyst entering a FCC standpipe or as de-entraining device in fluidized beds as well as in other processes.

The arrangement of the blade (2) within the element structure (4) of the packing system (1) prevents excessive bubble growth and channeling, both of which reduce surface area for mass transfer. Another advantage of the claimed packing system (1) is its open area, when used for example in a stripper vessel, essentially the cross-sectional area of the stripper vessel available for catalyst and gas flow is maximized. Moreover, this results in compact new designs, or allows for capacity expansion in revamp projects.

According to an embodiment, the claimed packing system (1) is supplied as one or more element structures (4), for example four element structures (4) (see FIG. 2), and just like any structured packing, the element structures (4) are arranged in various or uniform patterns, as well as series of layers of element structures (4) within, e.g., a stripper vessel (not shown). The element structures (4) are comprised of two or more blades (2) positioned in alternating intersecting planes and are joined together to provide the multi-directional configuration. In this regard, the structured packing system (1) can be comprise of one or a plurality of element structures (4) placed or connected to adjacent element structures (4) oriented in different direction to form multi-directional gas solids flow directions within the packing system (1). FIG. 1 presents two block structures (4), however, a plurality of block structures (4) can be used to comprise the structured packing system (1), see for example FIG. 3.

The blades (2) provide alternating contiguous planes within the element structures (4) and can be, for example, welded or fastened together to form the rigid structure of the packing system (1). In the packing system (1) the element structures (4) are arranged so that blades (4) in each successive adjacent element structures (4) are positioned to provide a different gas solids flow direction from the planar surfaces of the blades (2) of each adjacent block structures (4). For example, in FIG. 1, FIG. 2, and FIG. 3 the flow direction of the blades (2) of each adjacent element structures (4) are positioned at 900 angles with respect to each adjacent block structure (4). However, the element structures (4) can be rotated on their respective z axis relative to each adjacent element structure (4) any degree of rotation, for example from about 10° to about 170°, to provide different gas solids flow directions from each adjacent element structure (4).

Figure 2:
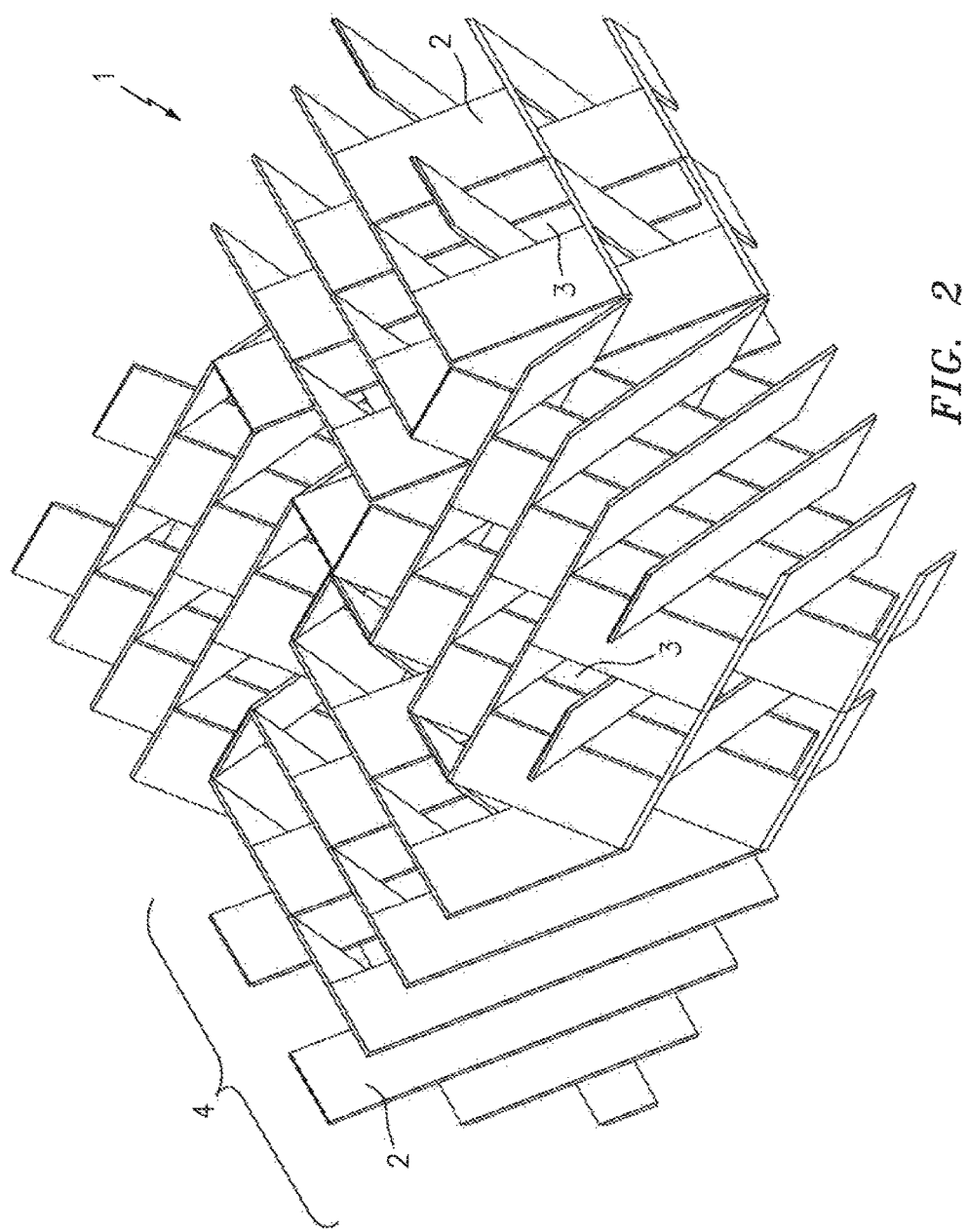
FIG. 2 is a schematic view of the structured packing system containing four element structures. The four element structures are positioned so that the gas solids flow directions of each adjacent element structure is at a 900 angle with respect to each adjacent element structure.

According to an embodiment and as presented in FIG. 2, a plurality of element structures (4) can be arranged in, for example, a "square" design, so that each adjacent element structure (4) provides a different gas solids flow direction. For example, the four element structures (4) presented in FIG. 2 are rotated 90° with respect to each adjacent element structure (4). Thus, the gas solids flow directions from the blades (2) of each adjacent element structure (4) provides different gas solids flow directions. Further, each cater-cornered element structures (4) within the aforementioned embodiment have the same gas solids flow directions from the blades (2). As such, a 4-Directional or "4-D" packing system is provided, on top of which a layer of element structures (4) can be added and positioned to provide a different gas solids flow direction from the blades (2) of the element structures (4) on the added layer.

Rotating the adjacent element structures (4) changes the direction of the plane of the blades (2) relative to each adjacent element structure (4) and promotes and enhances redistribution of the solid and gas phases within the structured packing system (1). In this regard, at any point on a given layer of the element structures (4) within the packing system (1) the blades (2) in each adjacent block structures (4) provide a different orientation with respect to redistribution of the solid and gas phases.

According to an embodiment, the element structures (4) can be square and the adjacent element structures (4) within each layer of the packing system (1) have differing orientations with respect to each adjacent element structure (4). However, other shapes for the element structures (4), such as, round, oval, rectangular, hexagonal, and the like are contemplated herein. According to an embodiment, multi-orientation arrangement of the element structures (4) within one layer of the packing system (1) is utilized with the next and successive layers (a plurality of layers may be used) of element structures (4) having different orientations to further promote redistribution of the catalyst and gas.

Figure 3:
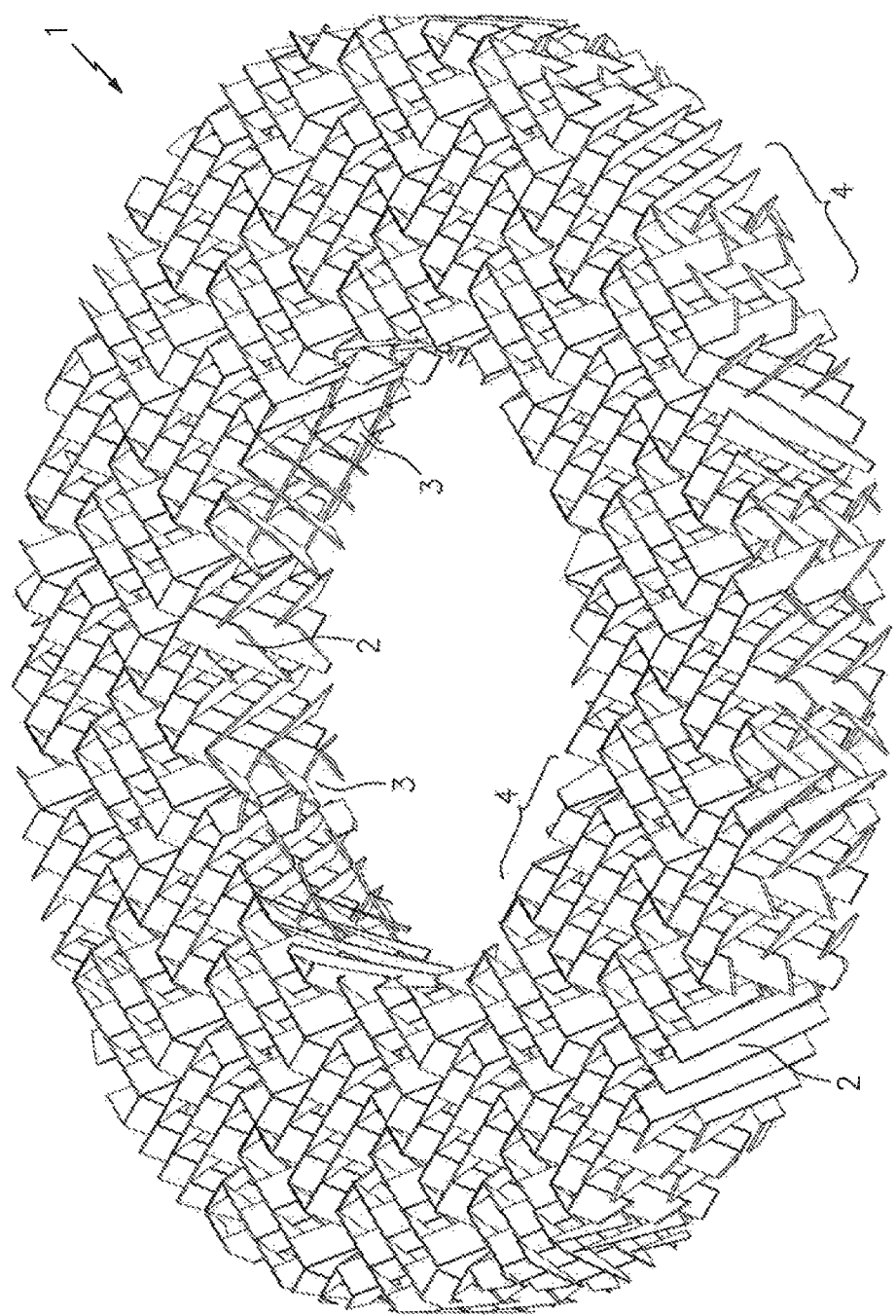
FIG. 3 is a schematic view of the structured packing system having a first level containing a plurality of element structures in a circular arrangement with an opening in the center for an internal riser.

FIG. 3 presents an embodiment of the claimed structured packing system (1), wherein a plurality of adjacent element structures (4) are rotated within the same layer to promote gas and catalyst flow and mixing in at least four different directions within that level in addition to a directional flow change upon movement of the gas catalyst (solid particles) flow from layer to layer of packing system (1). This orientation of the element structures (4) within each layer of the packing system (1) promotes more intense radial mixing of the gas and catalyst within each layer and helps to maintain flow uniformity across the fluidized bed.

Computational fluid dynamics (CFD) modelling of prior art structured packing indicates that localized channeling occurs at the blade (2) surfaces and reduces the surface area for contact. Additionally, CFD modeling of prior art structured packing indicates that a portion of the gas collects on the underside of the blade (2) and flows up, while portions of dense catalyst particles flows on the upper-side of the blades (2) and flow down and these portions do not mix. Thus, unless either phase flows off of the blades (2) there is more or less no contact between the phases.

In this regard, there are several embodiments of the claimed packing system (1) that counteract the reported phase separation. According to one embodiment, a plurality of slits (6) and/or holes (7) are placed into the blades, and/or a plurality of notches (8) are placed into the edge(s) of the blade (2) to provide increased gas solids mixing within the structured packing system (1).

Figure 4:
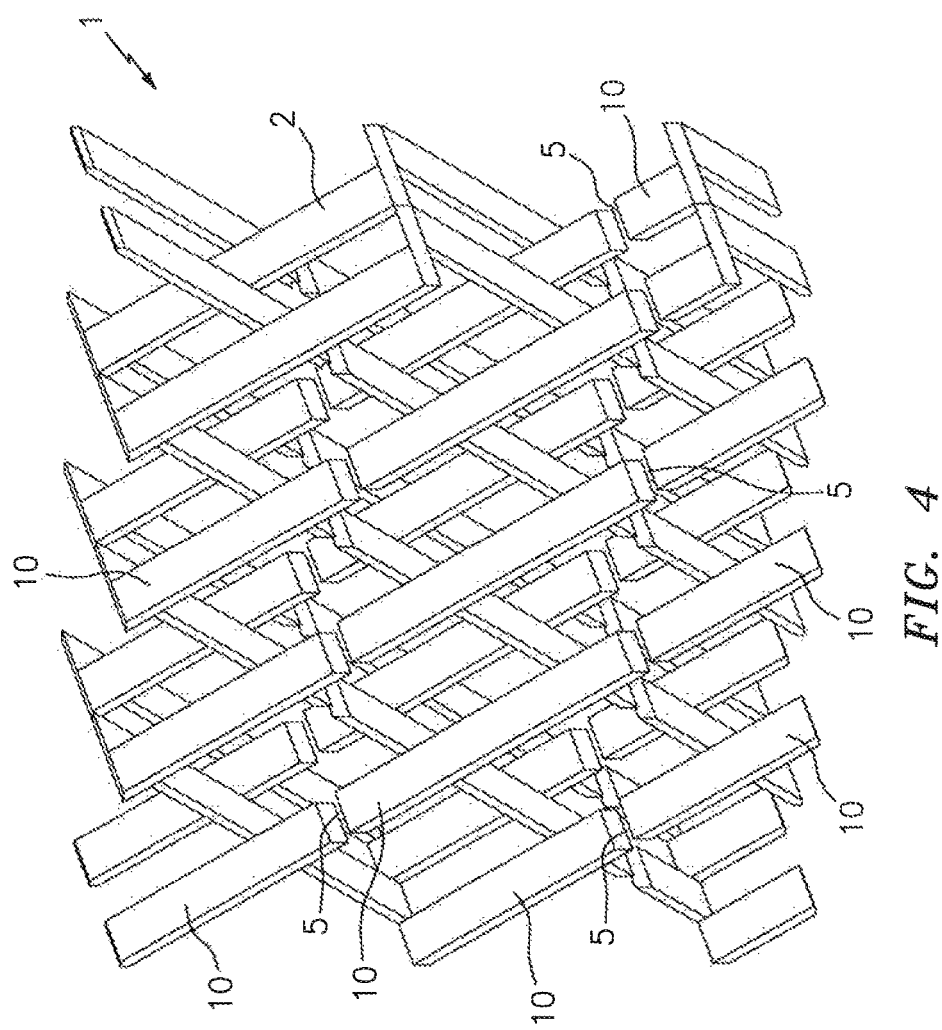
FIG. 4 is a schematic view of an element structure comprising blades and first, second, and third split blade sections.
Figure 6D:
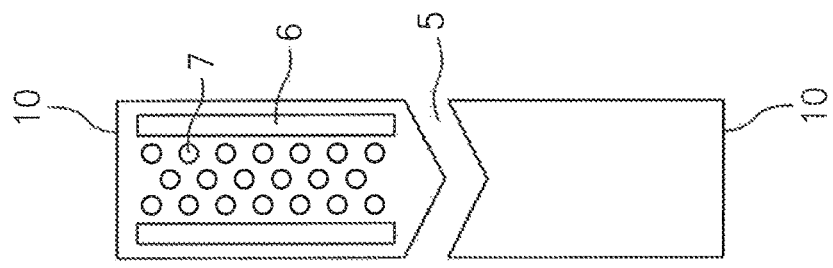
FIG. 6A, FIG. 6B, FIG. 6C, and FIG. 6D are top perspective views of two split blade sections, wherein the shape of the splits are straight, curved, angled, and v-shaped, respectively, and the split blade sections comprise combinations of slits, notches, and holes.
Figure 6C:
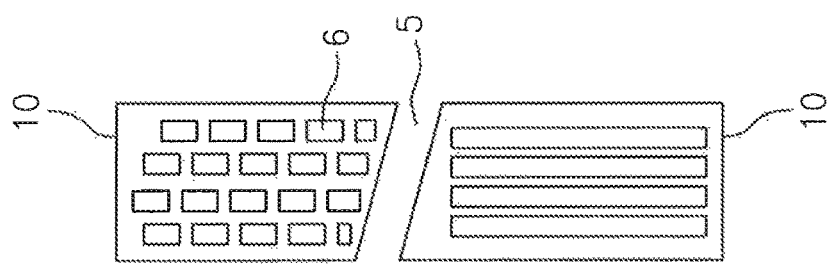
Figure 6B:
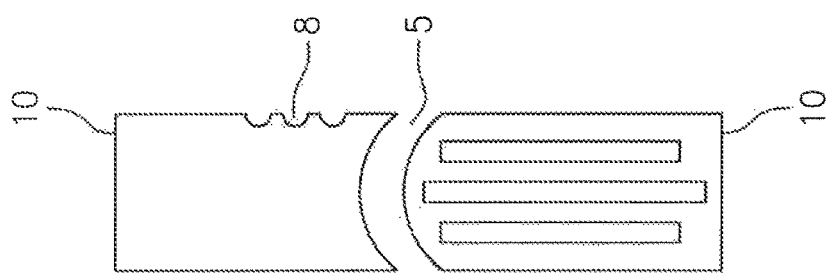
Figure 6A:
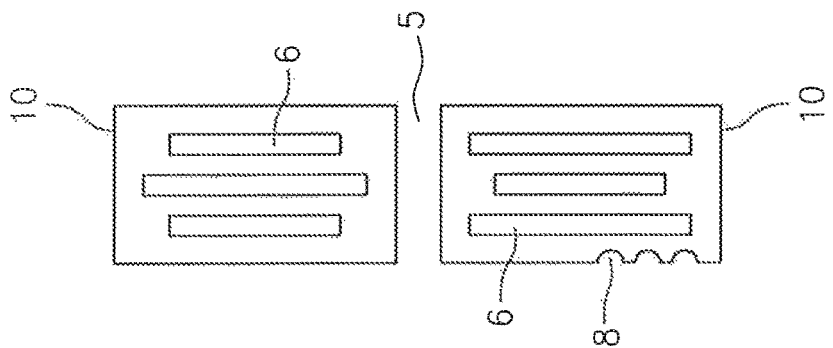

According to another embodiment of the claimed packing system (1), as presented in FIG. 4, the blades (2) which make up the element structures (4) of the packing system (1) are divided or split (5) into at least a first and a second split blade section (10), i.e., one or more of the blades (2) are separated into two or a plurality of split blade sections (10) within the element structure (4). As such, FIG. 4 presents a side-view of an element structure (4) comprising a plurality of blades (2), splits (5), and split blade sections (10).

In FIG. 4 the element structure (4) contains blades (2) having splits (5) that allow portions of catalyst to pass into the open spaces (3) between and around the blades (2) and split blade sections (10), thus allowing the catalyst to interact with the gas flowing up underneath the blades (2) and split blade sections (10). In this regard, improved gas solids/catalyst interaction is provided within the same layer of the structured packing system (1).

Further, the split blade sections (10) continue to provide alternating and intersecting contiguous planes within the element structures (4). The split blade sections (10) are welded or fastened together to form the rigid structure of the packing system (1). The alternating intersecting blade sections (10), like the blades (2) are joined together at one end and/or at an intermediate portion along the length of the blades.

In addition to being welded or fastened together at the one or both ends, the split bade sections (10) can be linked together at the separation or split (5), for example, in a bicycle chain link manner (not shown). According to another embodiment the two or more split bade sections (10) can be arranged so that split bade sections (10) are in-line, i.e., coplanar, or off-set, as presented in FIGS. 5A-C, respectively. Specifically, the plane of the second blade section (10) can be offset to be parallel to the plane of the first blade section above or below the first blade section (10). In this manner, a third blade section (10) can be in-line, or off-set, with respect to the first and/or second blade section (10). Although not necessary, the use of an off-set arrangement provides for enhanced cross-mixing of the two phases when compared to the in-line or coplanar arrangement.

The alternating and intersecting blades (2) and blade sections (10) are generally angled at about 45 degrees from a fall-line, however, the angle can be more or less than 45 degrees when assembled into the element structure (4).

Further, the blades (2) and/or the split blade sections (10) can have one or a plurality of slits (6) (or slots) within the length of the blade (2) or split blade section (10). The splits (5) and/or slits (6) provide for portions of catalyst to shower down into the open areas or open spaces (3) and through the gas flowing up from underneath the lower portion of the blades (2) or split blade section (10). The splits (5) and/or slits (6) improve and promote intense gas catalyst mixing within the same layer of the structured packing system (1).

FIGS. 6 A-D, respectively, present the blades (2) having been separated by splits (5) to provide at least a first and at least a second split blade section (10). The split blade sections (10) contain any one or combination of the aforementioned embodiments, i.e., holes (7) (FIG. 6D), notches (8) (FIGS. 6 A-B), and slits (6) (FIGS. 6A-D), to improve mixing and mass transfer. The size of the holes (7), notches (8), splits (5), and slits (6) are not limited and can be any size as required for improved gas catalyst mixing. The splits (5) are not limited with respect to the number of splits (5) per blade (2) and the angle or shape of the split (5) through the blade (2). For example, and as presented in FIG. 6 the split (5) can be straight, curved, angled, v-shaped or some other geometry. Further, the edge of the split (5) (or "cut" within the blade (2)), can be square or angled to the surface of the blade structure (2).

According to an embodiment, the claimed packing system (1) can comprise a plurality of square element structures (4) forming a single layer structured packing system (1), see for example FIG. 3. Alternatively, and according to another embodiment the claimed packing system (1) can comprise a single element structure (4) having multi-direction blade structures (2). FIG. 1 presents two "square" element structures (4), each element structure (4) having at least 4 rows of alternating and intersecting blades (2), however, the number of blades (2) per element structure (4) is not limited.

The results described hereinabove reflect the advantages of the stripping system according to the embodiments described herein. In particular, the improved contact between gaseous fluid and catalyst particles within the structured packing system (1) resulting in reduced hydrocarbon entrainment.

It is to be understood that the embodiments disclosed herein defined by the appended claims is not to be limited by particular details set forth in the above description as many apparent variations thereof are possible.

What is claimed is:

1. A packing system comprising at least one element structure, the element structure comprises a plurality of planar blades, each blade having a plane to provide a gas solids flow direction along the plane and the blades being arranged in alternating intersecting planes to provide a plurality of open spaces between or adjacent the alternating intersecting blades, the planes of the alternating intersecting blades provide at least two different gas solids flow directions for the element structure, and at least one blade comprises at least one split that separates the blade into at least a first split blade section and at least a second split blade section, wherein each split blade section has a plane and the split provides an area for passage to the open spaces.

2. The packing system of claim 1, containing at least four element structures wherein each adjacent element structure is positioned so that the gas solids flow directions of each adjacent element structure is different.

3. The packing system of claim 2, wherein the gas solids flow directions of each adjacent element structure is positioned at a 90 degree angle from each adjacent element structure.

4. The packing system of claim 1, wherein a plurality of element structures are positioned so that the gas solids flow directions is different from each adjacent element structure.

5. The structured packing system of claim 1, wherein the plane of the first blade section is coplanar with the plane second blade section.

6. The structured packing system of claim 1, wherein the plane of the second blade section is offset to a plane that is parallel to the plane of the first blade section above or below the first blade section.

7. The structured packing system of claim 1, wherein the blade has at least two splits and at least a third split blade section that has a plane and the plane of the third blade section is coplanar with the plane of the first and/or second split blade section, or the plane of the third split blade section is offset to a plane that is parallel to the plane of the first and/or second blade section above or below the first and/or second blade section.

8. The packing system of claim 1, wherein the split provides an edge to the first split blade section and the second split blade section that is square or angled to the plane of the blade.

9. The packing system of claim 8, wherein the split has a shape that is selected from the group consisting of straight, curved, angled, and v-shaped.

10. The packing system of claim 1, wherein at least one blade and/or the blade section further comprise at least one slit.

11. The packing system of claim 1, wherein at least one blade and/or blade section further comprise at least one hole and/or notch.

12. The packing system of claim 1, wherein the blade and/or blade sections are angled at less than 90 degrees from a fall-line of the blade and/or blade sections when assembled into the element structure.

13. The packing system of claim 1, wherein a plurality of element structures provide a first level of the packing system.

14. The packing system of claim 13, wherein the packing system has at least a second level that is positioned above the first level and each element structure of the second level is positioned with respect to each element structure immediately below in the first level so that the gas solids flow directions of each element structure of the second level is different from the gas solids flow directions of each element structure immediately below in the first level.

15. The packing system of claim 1, wherein the shape of the element structure is selected from the group consisting of round, oval, rectangular, and hexagonal.

16. A gas-solid fluidized bed comprising a vessel having a shell and an internal region within the shell containing a packing system comprising at least one element structure, the element structure comprises a plurality of planar blades, each blade having a plane to provide a gas solids flow direction along the plane and the blades being arranged in alternating intersecting planes to provide a plurality of open spaces between or adjacent the alternating intersecting blades, the planes of the alternating intersecting blades provide at least two different gas solids flow directions for the element structure, and at least one blade comprises at least one split that separates the blade into at least a first split blade section and at least a second split blade section, wherein each split blade section has a plane and the split provides an area for passage to the open spaces and at least one gas stream flowing counter-currently to solid particles through the structured packing system and causing fluidization of the solid particles within the structured packing system to form the gas-solid fluidized bed.

17. The gas-solid fluidized bed of claim 16, wherein a plurality of element structures are positioned so that the gas solids flow directions is different from each successive adjacent element structure.

18. The gas-solid fluidized bed of claim 16, wherein the plane of the first blade section is coplanar with the plane second blade section or the plane of the second blade section is offset to a plane that is parallel to the plane of the first blade section above or below the first blade section.

19. The gas-solid fluidized bed of claim 16, wherein a plurality of element structures provide a first level of the packing system.

20. The gas-solid fluidized bed of claim 19, wherein the packing system has at least a second level that is positioned above the first level and each element structure of the second level is positioned with respect to each element structure immediately below in the first level so that the gas solids flow directions of each element structure of the second level is different from the gas solids flow directions of each element structure immediately below in the first level.

21. A method for increasing mass transfer between a gas and a solid particle, said method comprising: i) passing a gas stream and solid particles in a counter-current manner through a packing system comprising at least one element structure, the element structure comprises a plurality of planar blades, each blade having a plane to provide a gas solids flow direction along the plane and the blades being arranged in alternating intersecting planes to provide a plurality of open spaces between or adjacent the alternating intersecting blades, the planes of the alternating intersecting blades provide at least two different gas solids flow directions for the element structure, and at least one blade comprises at least one split that separates the blade into at least a first split blade section and at least a second split blade section, wherein each split blade section has a plane and the split provides an area for passage to the open spaces; and ii) causing fluidization of the solid particles within the packing system to provide a mass transfer between a gas and a solid particle.

22. The method for increasing mass transfer between a gas and a solid particle of claim 21, wherein a plurality of element structures are positioned so that the gas solids flow directions is different from each successive adjacent element structure.

23. The method for increasing mass transfer between a gas and a solid particle of claim 21, wherein the plane of the first blade section is coplanar with the plane second blade section or the plane of the second blade section is offset to a plane that is parallel to the plane of the first blade section above or below the first blade section.

24. The method for increasing mass transfer between a gas and a solid particle of claim 21, wherein a plurality of element structures provide a first level of the packing system.

25. The method for increasing mass transfer between a gas and a solid particle of claim 21, wherein the packing system has at least a second level that is positioned above the first level and each element structure of the second level is positioned with respect to each element structure immediately below in the first level so that the gas solids flow directions of each element structure of the second level is different from the gas solids flow directions of each element structure immediately below in the first level.

* * * * *